US012731939B2

(12) United States Patent
Matsuoka

(10) Patent No.: US 12,731,939 B2
(45) Date of Patent: Sep. 8, 2026

(54) CONNECTOR

(71) Applicant: SUMITOMO WIRING SYSTEMS, LTD., Mie (JP)

(72) Inventor: Hiroyuki Matsuoka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 355 days.

(21) Appl. No.: 18/563,468

(22) PCT Filed: Jun. 3, 2022

(86) PCT No.: PCT/JP2022/022580

§ 371 (c)(1),
(2) Date: Nov. 22, 2023

(87) PCT Pub. No.: WO2022/255476

PCT Pub. Date: Dec. 8, 2022

(65) Prior Publication Data

US 2024/0250470 A1 Jul. 25, 2024

(30) Foreign Application Priority Data

Jun. 4, 2021 (JP) ................................ 2021-094667

(51) Int. Cl.
*H01R 13/52* (2006.01)
*H01R 13/512* (2006.01)
*H01R 13/74* (2006.01)

(52) U.S. Cl.
CPC ....... *H01R 13/5202* (2013.01); *H01R 13/512* (2013.01); *H01R 13/748* (2013.01); *H01R 2201/26* (2013.01)

(58) Field of Classification Search
CPC ............. H01R 13/5202; H01R 13/512; H01R 13/748; H01R 2201/26
(Continued)

(56) References Cited

U.S. PATENT DOCUMENTS 8,434,767 B2 * 5/2013 Takeshita ............... F16J 15/064 277/630
8,562,381 B2 * 10/2013 Kawamura ............ H01R 11/12 439/801
(Continued)

FOREIGN PATENT DOCUMENTS

JP 2012-119263 A 6/2012

OTHER PUBLICATIONS

International Search Report issued on Jul. 19, 2022 for WO 2022/255476 A1 (4 pages).

*Primary Examiner* — Gary F Paumen
(74) *Attorney, Agent, or Firm* — Venjuris, P.C.

(57) ABSTRACT

A connector according to one aspect of the present disclosure is provided with a housing including an inserting portion and an annular first sealing member to be mounted on an outer peripheral surface of the inserting portion. The first sealing member includes a sealing body and an engaging portion having a first engaging projection and a second engaging projection. The first and second engaging projections are provided at positions overlapping each other in a Z-axis direction. The first engaging projection projects more toward one side in a circumferential direction than the second engaging projection. The second engaging projection projects more toward the other side in the circumferential direction than the first engaging projection. An accommodation groove provided in the outer peripheral surface of the inserting portion includes a groove body and an engaged portion having a first engaging groove and a second engaging groove.

8 Claims, 11 Drawing Sheets

(58) Field of Classification Search
USPC .......................................................... 439/559
See application file for complete search history.

(56) References Cited

U.S. PATENT DOCUMENTS

| | | | |
|---|---|---|---|
| 11,189,956 | B2 * | 11/2021 | Tanimura ........... H01R 13/5202 |
| 2010/0148453 | A1 | 6/2010 | Takeshita et al. |
| 2012/0142214 | A1 | 6/2012 | Kawamura |
| 2021/0066847 | A1 | 3/2021 | Tanimura et al. |

* cited by examiner

CONNECTOR

CROSS REFERENCE TO RELATED APPLICATIONS

This application is a national phase of PCT application No. PCT/JP2022/022580, filed on 3 Jun. 2022, which claims priority from Japanese patent application No. 2021-094667, filed on 4 Jun. 2021, all of which are incorporated herein by reference.

TECHNICAL FIELD

The present disclosure relates to a connector.

BACKGROUND

Patent Document 1 discloses a connector provided with a terminal fitting and a tubular connector housing for holding the terminal fitting. An annular sealing member is mounted on the outer peripheral surface of the connector housing. The sealing member is accommodated in an accommodation groove provided in the outer peripheral surface of the connector housing.

The sealing member is provided with two positioning pieces projecting toward sides opposite to each other in an axial direction of the sealing member. The two positioning pieces have the same shape and are provided at the same position in a circumferential direction of the sealing member.

The accommodation groove is provided with positioning recesses, into which the respective positioning pieces are accommodated. The sealing member is positioned in the accommodation groove by these.

PRIOR ART DOCUMENT

Patent Document

Patent Document 1: JP 2012-119263 A

SUMMARY OF THE INVENTION

Problems to be Solved

For example, in a sealing member including positioning pieces smaller than those described in Patent Document 1, the positioning pieces of the sealing member can be accommodated into the positioning recesses of the accommodation groove. Thus, the sealing member may be erroneously assembled with the connector housing.

The present disclosure aims to suppress the erroneous assembling of a sealing member.

Means to Solve the Problem

The present disclosure is directed to a connector to be inserted into an insertion hole provided in a connection target, the connector being provided with a plurality of terminals parallel to each other, a plurality of wires to be respectively connected to the plurality of terminals, a housing made of resin and including an inserting portion to be inserted into the insertion hole, the housing holding the plurality of terminals and the plurality of wires, and an annular sealing member for stopping water between the inserting portion and the insertion hole by being mounted on an outer peripheral surface of the inserting portion, when a circumferential direction and an axial direction of the sealing member are respectively merely referred to as a circumferential direction and an axial direction, the sealing member including an annular sealing body and an engaging portion having a first engaging projection and a second engaging projection projecting from the sealing body toward sides opposite to each other in the axial direction, the first and second engaging projections being provided at positions overlapping each other in the axial direction, the first engaging projection projecting more toward one side in the circumferential direction than the second engaging projection, the second engaging projection projecting more toward the other side in the circumferential direction than the first engaging projection, an accommodation groove for accommodating the sealing member being provided in the outer peripheral surface of the inserting portion, the accommodation groove including a groove body for accommodating the sealing body and an engaged portion having a first engaging groove and a second engaging groove extending toward the sides opposite to each other in the axial direction and to be respectively engaged with the first and second engaging projections, the first engaging groove extending more toward the one side in the circumferential direction than the second engaging groove, and the second engaging groove extending more toward the other side in the circumferential direction than the first engaging groove.

Effect of the Invention

According to the present disclosure, it is possible to suppress the erroneous assembling of a sealing member.

DETAILED DESCRIPTION TO EXECUTE THE INVENTION

Description of Embodiments of Present Disclosure

Figure 1:
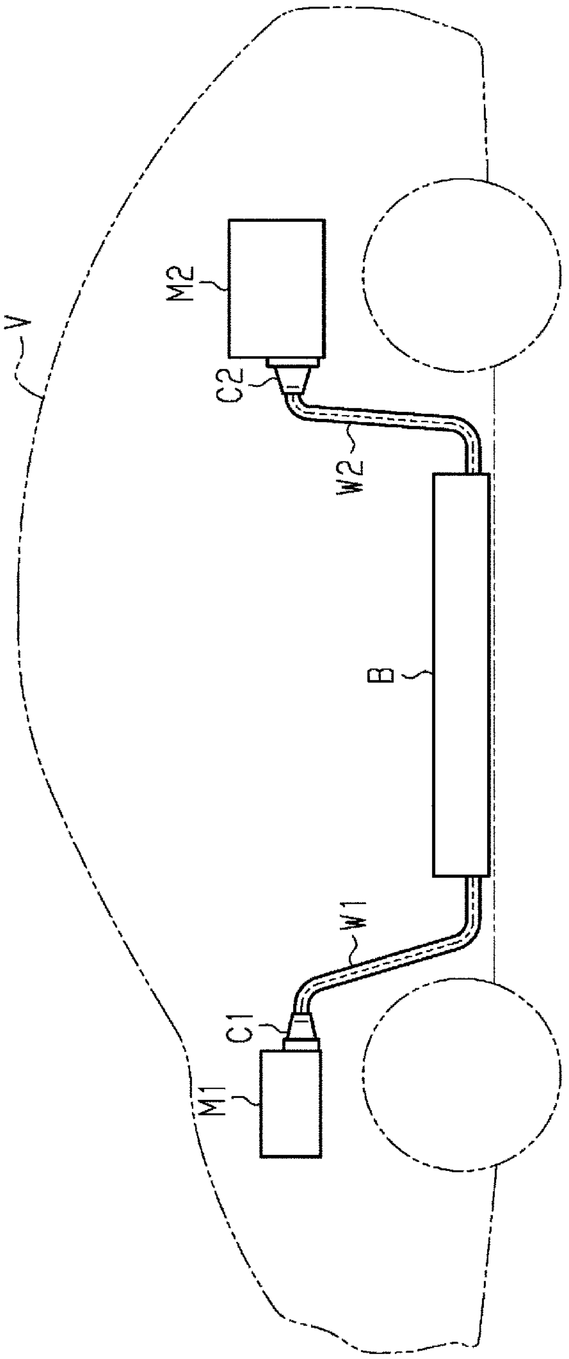
FIG. 1 is a diagram of a vehicle equipped with connectors of one embodiment.

First, embodiments of the present disclosure are listed and described.

[1] The connector of the present disclosure is to be inserted into an insertion hole provided in a connection target and provided with a plurality of terminals parallel to each other, a plurality of wires to be respectively connected to the plurality of terminals, a housing made of resin and including an inserting portion to be inserted into the insertion hole, the housing holding the plurality of terminals and the plurality of wires, and an annular sealing member for stopping water between the inserting portion and the insertion hole by being mounted on an outer peripheral surface of the inserting portion, when a circumferential direction and an axial direction of the sealing member are respectively merely referred to as a circumferential direction and an axial direction, the sealing member including an annular sealing body and an engaging portion having a first engaging projection and a second engaging projection projecting from the sealing body toward sides opposite to each other in the axial direction, the first and second engaging projections being provided at positions overlapping each other in the axial direction, the first engaging projection projecting more toward one side in the circumferential direction than the second engaging projection, the second engaging projection projecting more toward the other side in the circumferential direction than the first engaging projection, an accommodation groove for accommodating the sealing member being provided in the outer peripheral surface of the inserting portion, the accommodation groove including a groove body for accommodating the sealing body and an engaged portion having a first engaging groove and a second engaging groove extending toward the sides opposite to each other in the axial direction and to be respectively engaged with the first and second engaging projections, the first engaging groove extending more toward the one side in the circumferential direction than the second engaging groove, and the second engaging groove extending more toward the other side in the circumferential direction than the first engaging groove.

According to this configuration, the first engaging projection projects more toward one side in the circumferential direction than the second engaging projection, and the second engaging projection projects more toward the other side in the circumferential direction than the first engaging projection. Further, the first engaging groove extends more toward the one side in the circumferential direction than the second engaging groove, and the second engaging groove extends more toward the other side in the circumferential direction than the first engaging groove.

Thus, if the sealing member is mounted on another housing provided with the first and second engaging grooves having the same shape at the same position in the circumferential direction, it is difficult to engage the sealing member with the other housing. That is, it is difficult to respectively engage the first and second engaging projections on the sealing member with the first and second engaging grooves on the other housing. In this way, a worker easily notices the erroneous assembling of the sealing member with the other housing.

Further, if another sealing member provided with the first and second engaging projections having the same shape at the same position in the circumferential direction is mounted on the housing, it is difficult to engage the other sealing member with the housing. That is, it is difficult to respectively engage the first and second engaging projections on the other sealing member with the first and second engaging grooves on the housing. In this way, the worker easily notices the erroneous assembling of the other sealing member with the housing.

From the above, it can be suppressed that the sealing member is erroneously assembled with a housing different from a proper housing. Further, it can be suppressed that a sealing member different from a proper sealing member is erroneously assembled with the housing.

[2] Preferably, the housing includes a tubular portion having the inserting portion and a holding portion projecting from the tubular portion toward an outer peripheral side of the tubular portion, the holding portion holding the plurality of terminals and the plurality of wires, and when a direction orthogonal to both the axial direction and a projecting direction of the holding portion is an orthogonal direction, the engaging portion is provided at one end in the orthogonal direction of the sealing body, and the engaged portion is provided at one end in the orthogonal direction of the groove body.

During the injection molding of the housing, a pulling direction of a part of a mold for molding the holding portion may coincide with the axial direction of the sealing member, i.e. an axial direction of the tubular portion.

Here, the engaged portion of the accommodation groove extends in the axial direction from the groove body. Thus, the pulling direction of the mold for molding the engaged portion is a direction separating from the engaged portion toward an outer peripheral side of the groove body.

According to the above configuration, the engaged portion is provided at the one end in the orthogonal direction of the groove body. Thus, the pulling direction of the mold for molding the engaged portion can coincide with the orthogonal direction. In this way, it is possible to suppress the interference of the part of the mold for molding the holding portion and a part thereof for molding the engaging portion during the opening of the mold. Therefore, a reduction in the moldability of the housing can be suppressed. Further, the complication of the structure of the mold for molding the housing can be suppressed.

[3] Preferably, a central part in the circumferential direction of the first engaging projection is provided at a position overlapping the second engaging projection in the axial direction, and a central part in the circumferential direction of the second engaging projection is provided at a position overlapping the first engaging projection in the axial direction.

According to this configuration, an increase in the length of a part of the first engaging projection projecting beyond the second engaging projection on the one side in the circumferential direction and an increase in the length of a part of the second engaging projection projecting beyond the first engaging projection on the other side in the circumferential direction are suppressed. In this way, both ends in the circumferential direction of the engaging portion easily simultaneously come into the sight of the worker. Thus, the worker easily engages the first and second engaging projections respectively with the first and second engaging grooves. Therefore, workability when the sealing member is mounted can be improved.

[4] Preferably, the first and second engaging projections have the same shape.

According to this configuration, if the sealing member is inverted about a virtual axis orthogonal to a center axis of the sealing member, the shapes of the sealing member before and after inversion overlap. Thus, the worker can accommodate the inverted sealing member into the accommodation groove. Therefore, versatility when the sealing member is mounted can be enhanced.

Preferably, the sealing member includes a plurality of the engaging portions provided apart from each other in the circumferential direction, and the accommodation groove includes a plurality of the engaged portions provided apart from each other in the circumferential direction.

According to this configuration, since the connector is provided with the plurality of engaging portions and the plurality of engaged portions, the worker more easily notices the erroneously assembling of the sealing member.

[6] Preferably, the sealing member includes two engaging portions located on sides opposite to each other across the center axis of the sealing member and is shaped to be point symmetric with the center axis as an axis of symmetry, and the accommodation groove includes two engaged portions located on sides opposite to each other across the center axis.

According to this configuration, if the sealing member is inverted about the center axis or about a virtual axis orthogonal to the center axis, the shapes of the sealing member before and after inversion overlap. Thus, the worker can accommodate the inverted sealing member into the accommodation groove. Therefore, versatility when the sealing member is mounted can be further enhanced.

[7] Preferably, a shield shell is provided which is made of metal and covers an outer periphery of the housing, and the sealing member is located outside the shield shell.

According to this configuration, it can be avoided that the sealing member is covered by the shield shell. Therefore, the worker more easily confirms the presence and mounting posture of the sealing member.

Details of Embodiment of Present Disclosure

A specific example of a connector of the present disclosure is described below with reference to the drawings. For the convenience of description, some components may be shown in an exaggerated or simplified manner in each drawing. Further, a dimension ratio of each part may be different in each figure. Note that the present disclosure is not limited to these illustrations, but is represented by claims and intended to include all changes in the scope of claims and in the meaning and scope of equivalents. "Orthogonal" in this specification means not only strictly orthogonal, but also substantially orthogonal within a range in which functions and effects in this embodiment are achieved.

(Configurations of Wiring Harnesses W1, W2)

As shown in FIG. 1, wiring harnesses W1, W2 are routed in a vehicle V. The wiring harness W1 electrically connects, for example, an electric device M1 such as a motor arranged in a front part of the vehicle V and a battery B arranged in a floor part of the vehicle V. The wiring harness W2 electrically connects, for example, an electric device M2 such as a motor arranged in a rear part of the vehicle V and the battery B.

A connector C1 to be connected to the electric device M1 is provided on an end part of the wiring harness W1. A connector C2 to be connected to the electric device M2 is provided on an end part of the wiring harness W2. The configuration of the connector C1 and that of the connector C2 may be the same or may be different from each other. The electric device M1 corresponds to a "connection target".

(Configuration of Connector C1)

Figure 2:
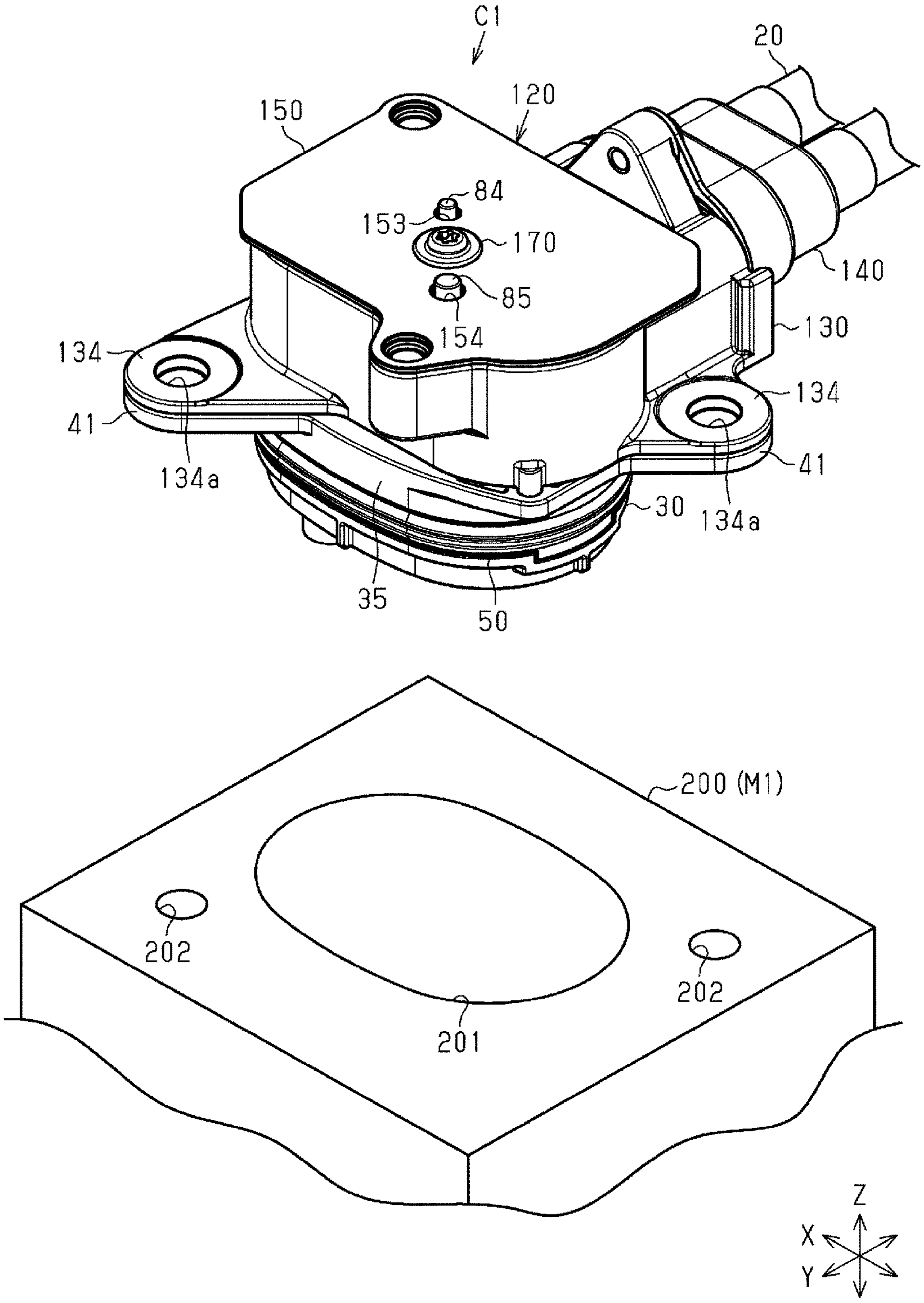
FIG. 2 is a perspective view of the connector.

As shown in FIG. 2, the connector C1 is mounted on a case 200 of the electric device M1 while being partially inserted into an insertion hole 201 provided in the case 200.

Figure 3:
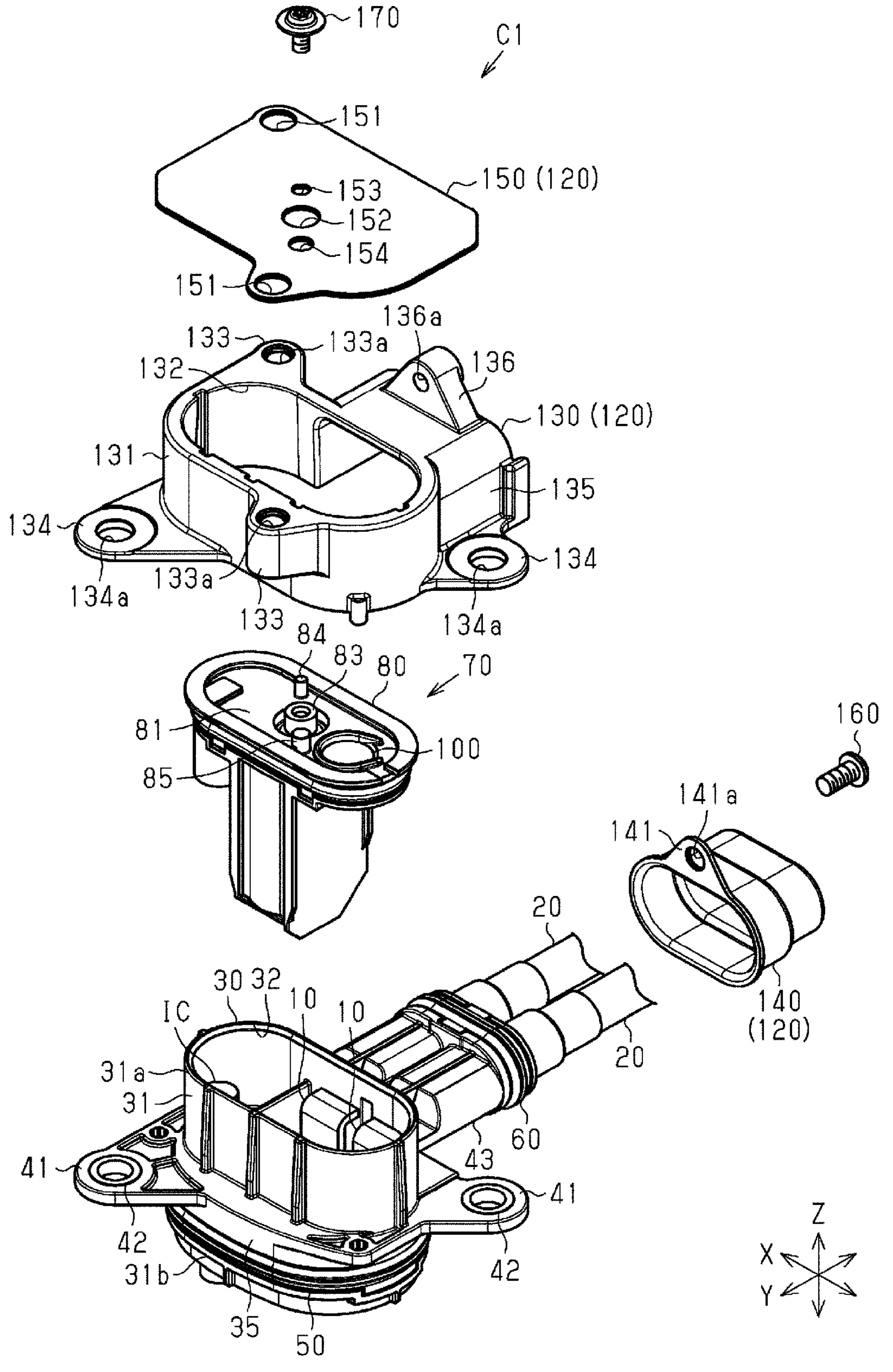
FIG. 3 is an exploded perspective view of the connector.

As shown in FIG. 3, the connector C1 is provided with a plurality of terminals 10, a plurality of wires 20, a housing 30, a cover 70 and a shield shell 120. The plurality of terminals 10 are parallel to each other. The plurality of wires 20 are respectively electrically connected to the plurality of terminals 10. The housing 30 holds the plurality of terminals 10 and the plurality of wires 20. The cover 70 covers a part of the housing 30. The shield shell 120 covers parts of the cover 70 and the housing 30.

The connector C1 is, for example, provided with two terminals 10 and two wires 20. Note that the connector C1 may be provided with three or more terminals 10 and three or more wires 20.

Out of X, Y and Z axes of each figure, the X axis extends in a parallel direction of the two terminals 10. The Y axis extends in a longitudinal direction of the wires 20. The Z axis extends in a mounting direction of the case 200 of the electric device M1 and the connector C1. The X, Y and Z axes are orthogonal to each other. A direction along the X axis is referred to as an X-axis direction, a direction along the Y axis is referred to as a Y-axis direction and a direction along the Z axis is referred to as a Z-axis direction below.

The connector C1 is mounted on the case 200, for example, in such a posture that the X-axis direction and a vertical direction coincide. Note that an up-down direction on the plane of each figure does not necessarily coincide with the vertical direction.

(Configuration of Terminal 10)

Figure 4:
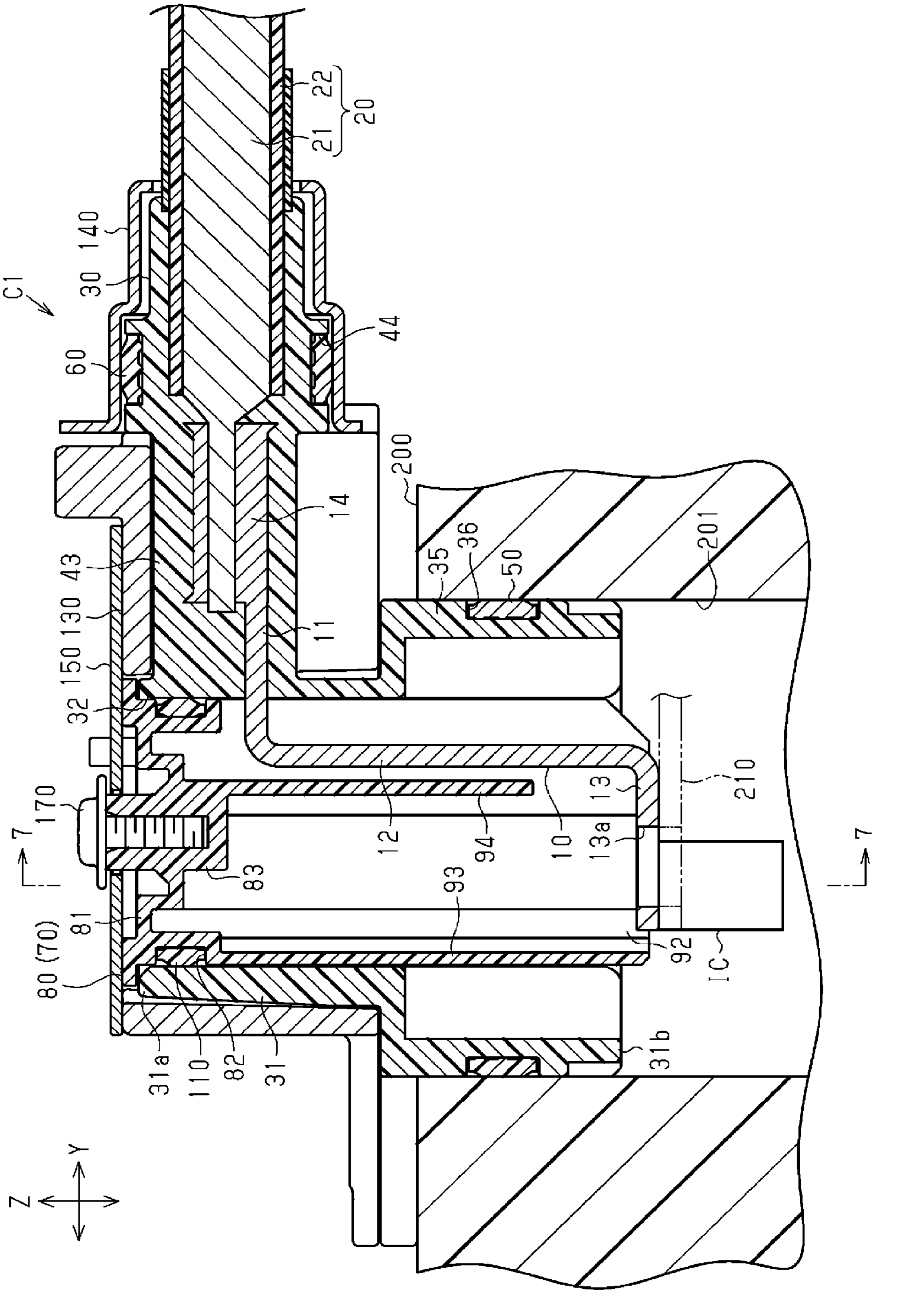
FIG. 4 is a section of the connector.

As shown in FIG. 4, the terminal 10 includes a first extending portion 11, a second extending portion 12 and a third extending portion 13. The terminal 10 is, for example, plate-like. An iron-based, copper-based or aluminum-based metal material can be, for example, cited as a material of the terminal 10.

The first extending portion 11 extends in the Y-axis direction. The first extending portion 11 includes a wire connecting portion 14 to be electrically connected to the wire 20. The wire connecting portion 14 is provided on an end part in the Y-axis direction of the first extending portion 11.

The second extending portion 12 extends in the Z-axis direction from an end part of the first extending portion 11 on a side opposite to the wire connecting portion 14 toward the case 200.

The third extending portion 13 extends toward a side opposite to the first extending portion 11 in an extending direction of the first extending portion 11, i.e. the Y-axis direction, from an end part of the second extending portion 12 on a side opposite to the first extending portion 11. The third extending portion 13 is located outside the housing 30.

The third extending portion 13 is provided with a bolt hole 13*a* penetrating in the Z-axis direction. The third extending portion 13 is electrically connected to a mating terminal 210 provided inside the case 200 by an unillustrated bolt inserted through the bolt hole 13*a*.

(Configuration of Wire 20)

The wire 20 includes a core wire 21 and an insulation coating 22 covering the outer periphery of the core wire 21. A copper-based or aluminum-based metal material can be, for example, cited as a material of the core wire 21. A resin material mainly containing a polyolefin-based resin such as cross-linked polyethylene or cross-linked polypropylene can be cited as a material of the insulation coating 22.

The core wire 21 is, for example, a stranded wire formed by twisting a plurality of metal strands. A cross-sectional shape of the core wire 21 orthogonal to a length direction is, for example, a circular shape.

The core wire 21 is exposed from the insulation coating 22 at an end part of the wire 20. The core wire 21 exposed from the insulation coating 22 is electrically connected to the wire connecting portion 14 of the terminal 10, for example, by crimping.

(Configuration of Housing 30)

Figure 5:
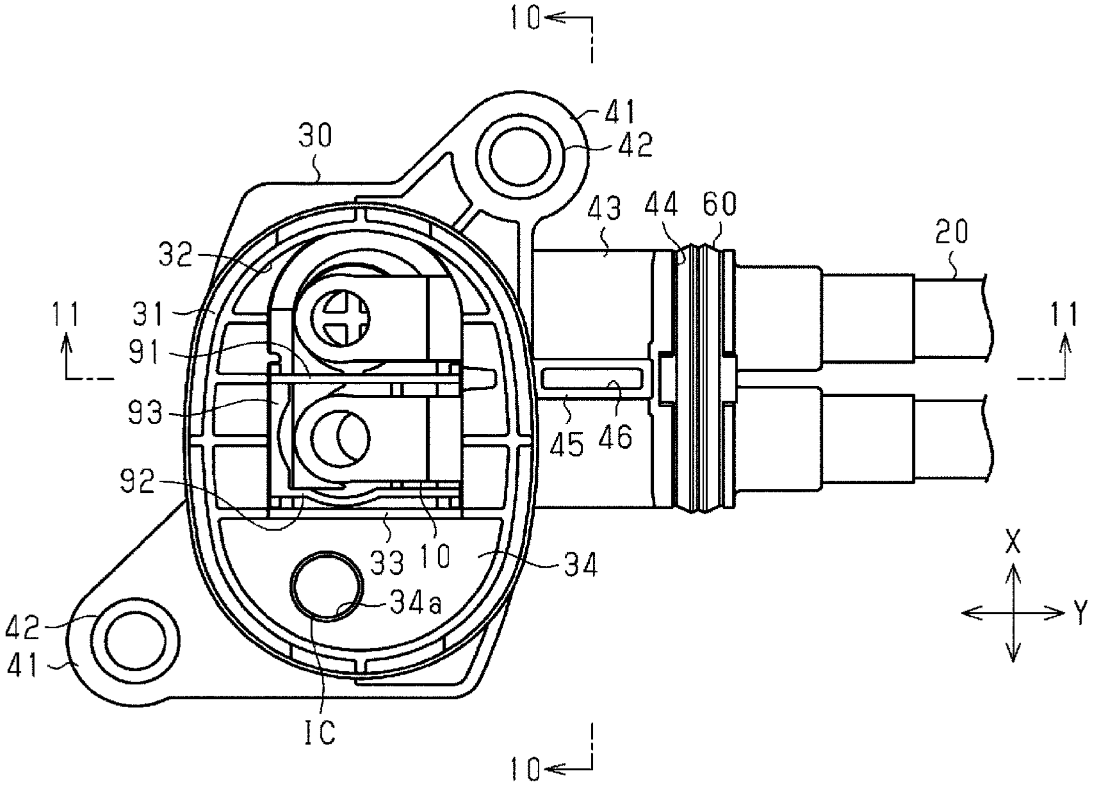
FIG. 5 is a bottom view of a housing.
Figure 6:
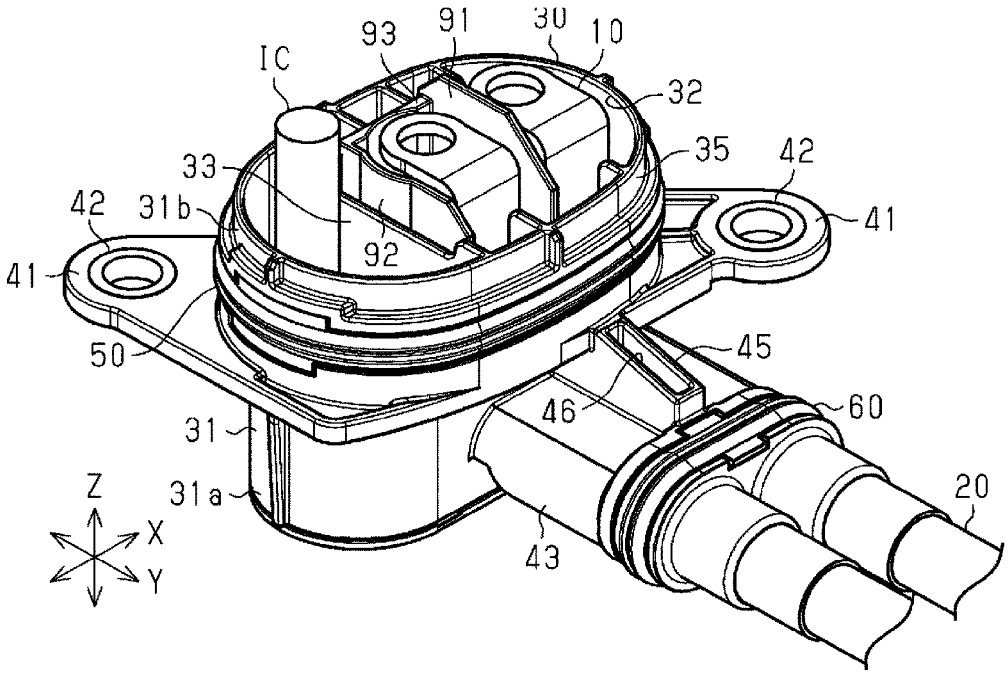
FIG. 6 is a perspective view of the housing.

As shown in FIGS. 5 and 6, the housing 30 includes a tubular portion 31 and a holding portion 43. A resin material such as polybutylene terephthalate (PBT) can be cited as a material of the housing 30.

(Configuration of Tubular Portion 31)

The tubular portion 31 includes an opening 32 through which the two terminals 10 are exposed. The opening 32 penetrates through the tubular portion 31 in the Z-axis direction. An axial direction of the tubular portion 31 coincides with the Z-axis direction. The opening edge of the tubular portion 31 has an elliptical shape long in the X-axis direction when viewed from the Z-axis direction.

An interlock connector IC is provided inside the tubular portion 31. The interlock connector IC is provided in parallel to the two terminals 10 in the X-axis direction.

The interlock connector IC is for electrically detecting whether or not the housing 30 is connected at a proper position with respect to the insertion hole 201 of the case 200. If the housing 30 is connected at the proper position with respect to the case 200, the interlock connector IC is connected to an unillustrated standby connector provided inside the case 200. An interlock circuit is configured by the interlock connector IC and the standby connector. If the interlock connector IC is connected to the standby connector, i.e. if the interlock circuit is closed, the connector C1 and the electric device M1 are in an energizable state.

As shown in FIG. 4, the tubular portion 31 has a first end part 31*a* and a second end part 31*b* located on sides opposite to each other in the Z-axis direction. The first end part 31*a* is a part of the tubular portion 31 on a side on which the cover 70 is mounted. The second end part 31*b* is a part of the tubular portion 31 to be inserted into the insertion hole 201 of the case 200.

Figure 7:
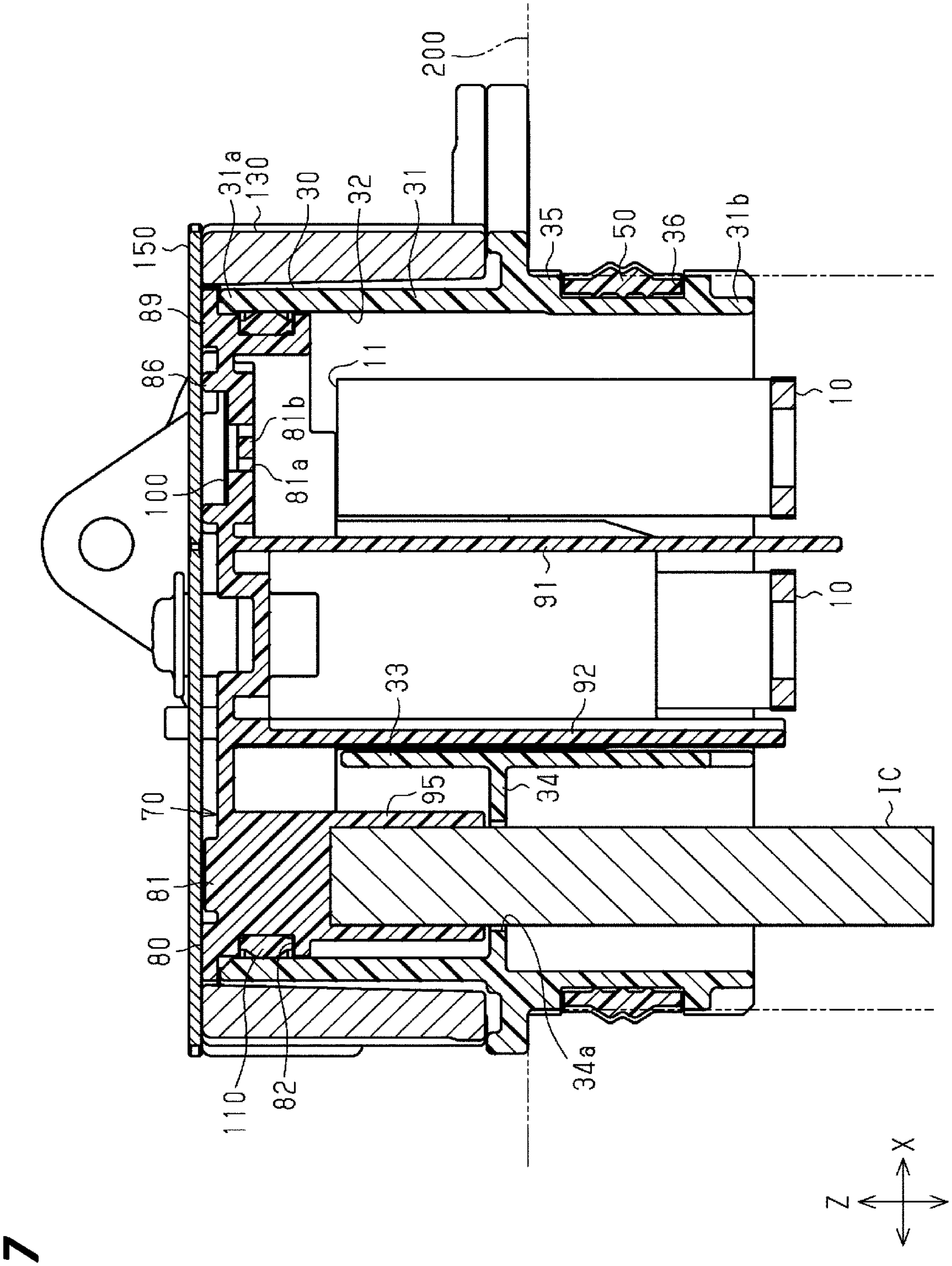
FIG. 7 is a section along 7-7 of FIG. 4.

As shown in FIGS. 5 and 7, the tubular portion 31 includes a first partition wall 33 and a second partition wall 34.

The first partition wall 33 is for partitioning the inside of the tubular portion 31 between the two terminals 10 and the interlock connector IC. The first partition wall 33 extends in the Z-axis direction. The first partition wall 33 couples parts facing each other in the Y-axis direction, out of the inner wall of the tubular portion 31. Therefore, the inside of the tubular portion 31 is partitioned into a part where the two terminals 10 are located and a part where the interlock connector IC is located by the first partition wall 33.

The second partition wall 34 is for partitioning the part where the interlock connector IC is located, out of the inside of the tubular portion 31, in the Z-axis direction. The second partition wall 34 couples the inner wall of the tubular portion 31 and the first partition wall 33.

The second partition wall 34 is provided with an insertion hole 34*a* penetrating in the Z-axis direction. The interlock connector IC is inserted into the insertion hole 34*a*.

Figure 8:
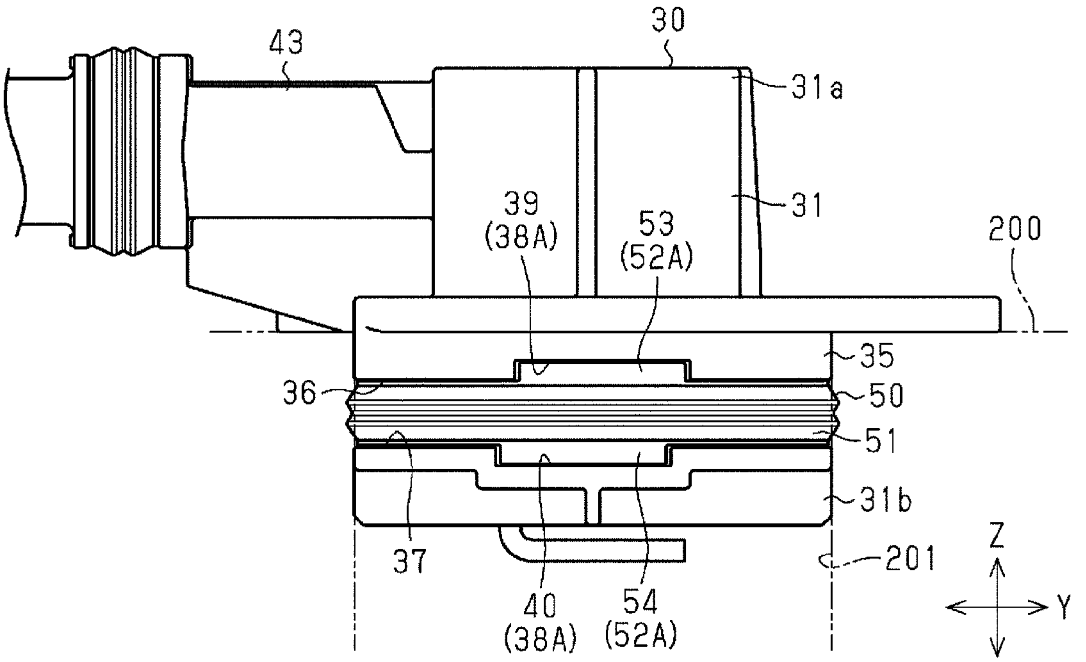
FIG. 8 is a side view of the housing.
Figure 9:
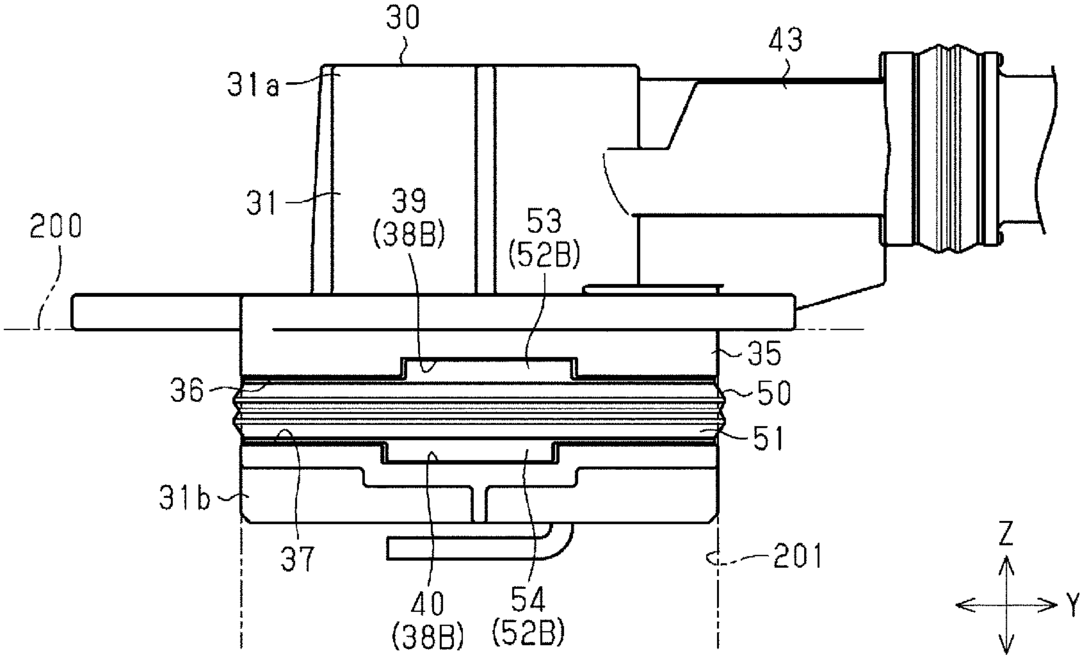
FIG. 9 is a side view of the housing.

As shown in FIGS. 8 and 9, the tubular portion 31 is provided with an inserting portion 35 to be inserted into the insertion hole 201 of the case 200. The inserting portion 35 is a part including the second end part 31*b*, out of the tubular portion 31.

A first accommodation groove 36 is provided over an entire periphery in the outer peripheral surface of the inserting portion 35. An annular first sealing member 50 is accommodated into the first accommodation groove 36. The first accommodation groove 36 corresponds to an "accommodation groove". The first sealing member 50 corresponds to a "sealing member".

An axial direction of the first sealing member 50 coincides with the Z-axis direction. A circumferential direction of the first sealing member 50 is merely referred to as a circumferential direction below.

The first accommodation groove 36 includes a groove body 37 and two engaged portions 38A, 38B.

The groove body 37 has an annular shape extending over an entire periphery in the outer peripheral surface of the tubular portion 31.

The two engaged portions 38A, 38B are provided apart from each other in the circumferential direction. The two engaged portions 38A, 38B are located on sides opposite to each other across a center axis of the first sealing member 50. The two engaged portions 38A, 38B are respectively provided on one end and the other end in the X-axis direction of the groove body 37.

Each engaged portion 38A, 38B includes a first engaging groove 39 and a second engaging groove 40. The first and second engaging grooves 39, 40 extend toward sides opposite to each other in the Z-axis direction. The first engaging groove 39 extends from the groove body 37 toward a side where the first end part 31*a* is located in the Z-axis direction. The second engaging groove 40 extends from the groove body 37 toward a side where the second end part 31*b* is located in the Z-axis direction. The first and second engaging grooves 39, 40 have the same shape.

The first and second engaging grooves 39, 40 are provided at positions overlapping each other in the Z-axis direction. The first engaging groove 39 extends more toward one side in the circumferential direction than the second engaging groove 40. The second engaging groove 40 extends more toward the other side in the circumferential direction than the first engaging groove 39.

"One side in the circumferential direction" in this embodiment means a counterclockwise direction when the second end part 31*b* is viewed from the first end part 31*a* of the tubular portion 31 in the Z-axis direction, and the "other side in the circumferential direction" means a clockwise direction.

The first engaging groove 39 of the engaged portion 38A and the second engaging groove 40 of the engaged portion 38B are provided at the same position in the Y-axis direction. The first engaging groove 39 of the engaged portion 38B and the second engaging groove 40 of the engaged portion 38A are provided at the same position in the Y-axis direction.

As shown in FIGS. 5 and 6, the tubular portion 31 includes two fixing portions 41 projecting toward an outer peripheral side of the tubular portion 31. The two fixing portions 41 project toward sides opposite to each other in a direction intersecting both the X-axis direction and Y-axis direction in an XY plane. Each fixing portion 41 is provided with a tubular collar 42 made of metal. Each collar 42 penetrates in the Z-axis direction.

(Configuration of Holding Portion 43)

As shown in FIG. 4, the holding portion 43 projects from the first end part 31*a* of the tubular portion 31 toward the outer peripheral side of the tubular portion 31, more specifically toward one side in the Y-axis direction. The holding portion 43 holds the two terminals 10 and the two wires 20. End parts of the wires 20, the wire connecting portions 14 and parts of the first extending portions 11 are embedded in the holding portion 43. The two terminals 10, the two wires 20 and the housing 30 are integrated by insert molding. Each wire 20 is pulled out from the holding portion 43 toward the one side in the Y-axis direction.

A second accommodation groove 44 is provided over an entire periphery in the outer peripheral surface of the holding portion 43. An annular second sealing member 60 is accommodated into the second accommodation groove 44.

(Configuration of Rib 45)

As shown in FIG. 6, the housing 30 includes a rib 45 coupling the outer surface of the holding portion 43 and the outer surface of the tubular portion 31. The rib 45 is provided on a side where the second end part 31*b* is located when viewed from the holding portion 43.

Figure 10:
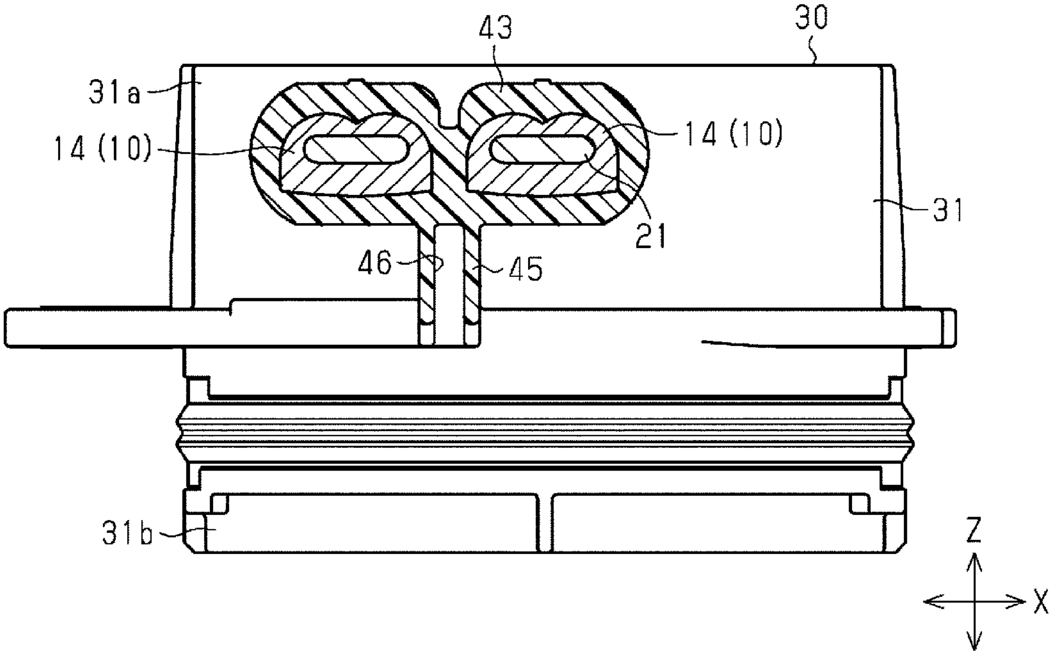
FIG. 10 is a section along 10-10 of FIG. 5 of the housing.

As shown in FIG. 10, the rib 45 projects from the outer surface of a part of the holding portion 43 located between the two terminals 10 adjacent to each other. That is, the rib 45 is located between the two terminals 10 in the X-axis direction.

As shown in FIG. 5, the rib 45 is provided at a position deviated toward one side in the X-axis direction from a central part in the X-axis direction of the outer surface of the tubular portion 31. The rib 45 is provided at a position overlapping the two wire connecting portions 14 in the Y-axis direction. Therefore, the rib 45 projects from the outer surface of a part of the holding portion 43 located between the two wire connecting portions 14 adjacent to each other.

Figure 11:
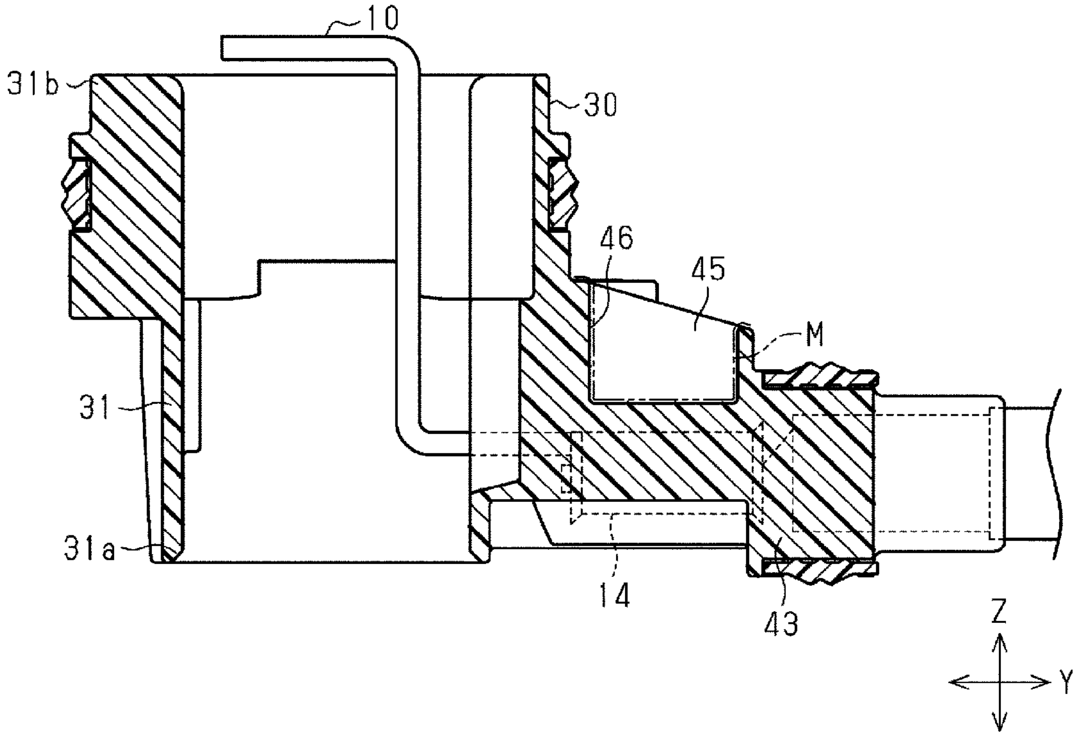
FIG. 11 is a section along 11-11 of FIG. 5 of the housing.

The rib 45 includes a recess 46. The recess 46 is recessed in a direction from the second end part 31*b* toward the first end part 31*a* along the Z-axis direction. A cross-sectional shape of the recess 46 orthogonal to the Z-axis direction is, for example, a rectangular shape long in the Y-axis direction. This cross-sectional shape is the same over the entire recess 46 in the Z-axis direction. That is, the inner wall of the rib 45 forming the recess 46 extends in the Z-axis direction over the entire periphery of the recess 46. As shown by a two-dot chain line in FIG. 11, the recess 46 is so configured that a mold M used during the injection-molding of the housing 30 is insertable thereinto.

A projecting amount of the rib 45 from the outer surface of the holding portion 43 decreases with distance from the tubular portion 31 in the Y-axis direction.

(Configuration of First Sealing Member 50)

Figure 12:
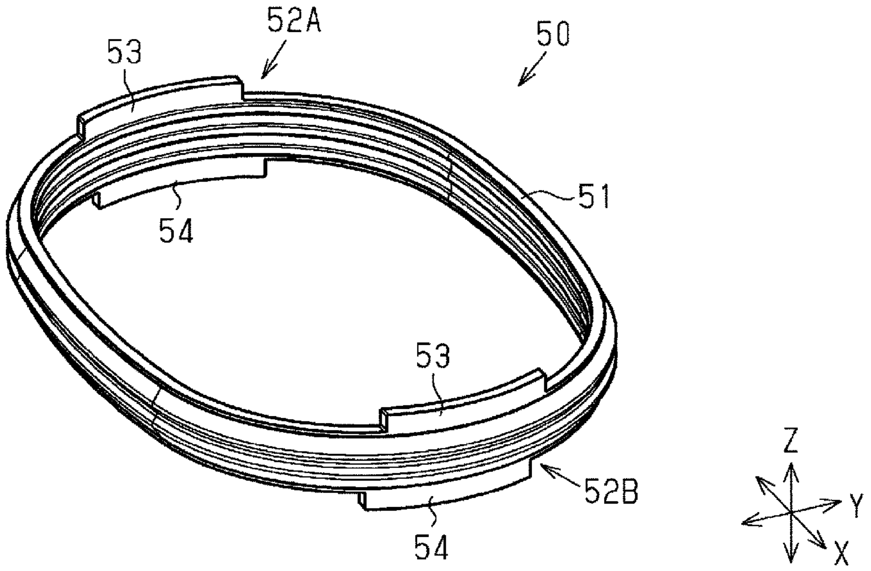
FIG. 12 is a perspective view of a first sealing member.

As shown in FIG. 12, the first sealing member 50 includes a sealing body 51 and two engaging portions 52A, 52B.

The sealing body 51 has an annular shape long in the X-axis direction. The sealing body 51 is provided with lips projecting toward an outer peripheral side over an entire periphery. The sealing body 51 is accommodated into the groove body 37 of the first accommodation groove 36.

The two engaging portions 52A, 52B are provided apart from each other in the circumferential direction. The two engaging portions 52A, 52B are located on sides opposite to each other across the center axis of the first sealing member 50. The two engaging portions 52A, 52B are respectively provided on one end and the other end in the X-axis direction of the sealing body 51.

As shown in FIGS. 8 and 9, each engaging portion 52A, 52B includes a first engaging projection 53 and a second engaging projection 54. The first and second engaging projections 53, 54 project from the sealing body 51 toward sides opposite to each other in the Z-axis direction. The first engaging projection 53 extends from the sealing member 51 toward the side where the first end part 31*a* is located in the Z-axis direction. The second engaging projection 54 extends from the sealing member 51 toward the side where the second end part 31*b* is located in the Z-axis direction. The first and second engaging projections 53, 54 have the same shape.

The first and second engaging projections 53, 54 are provided at positions overlapping each other in the Z-axis direction. The first engaging projection 53 projects more toward one side in the circumferential direction than the second engaging projection 54. The second engaging projection 54 projects more toward the other side in the circumferential direction than the first engaging projection 53. The first and second engaging projections 53, 54 are respectively engaged with the first and second engaging grooves 39, 40.

The first engaging projection 53 of the engaging portion 52A and the second engaging projection 54 of the engaging portion 52B are provided at the same position in the Y-axis direction. The first engaging projection 53 of the engaging portion 52B and the second engaging projection 54 of the engaging portion 52A are provided at the same position in the Y-axis direction.

From the above, the sealing member 50 is shaped to be point symmetric with each of the X, Y and Z axes as an axis of symmetry. That is, if the first sealing member 50 is inverted with each of the X, Y and Z axes as a center axis, the shapes of the first sealing member 50 before and after inversion overlap each other.

By accommodating the first sealing member 50 into the first accommodation groove 36, water is stopped between the inserting portion 35 and the insertion hole 201 of the case 200. Note that since the inserting portion 35 is located outside the shield shell 120, the first sealing member 50 is located outside the shield shell 120.

(Configuration of Cover 70)

As shown in FIG. 7, the cover 70 covers the opening 32 of the tubular portion 31 by being inserted into the tubular portion 31 from the first end part 31*a*.

Figure 13:
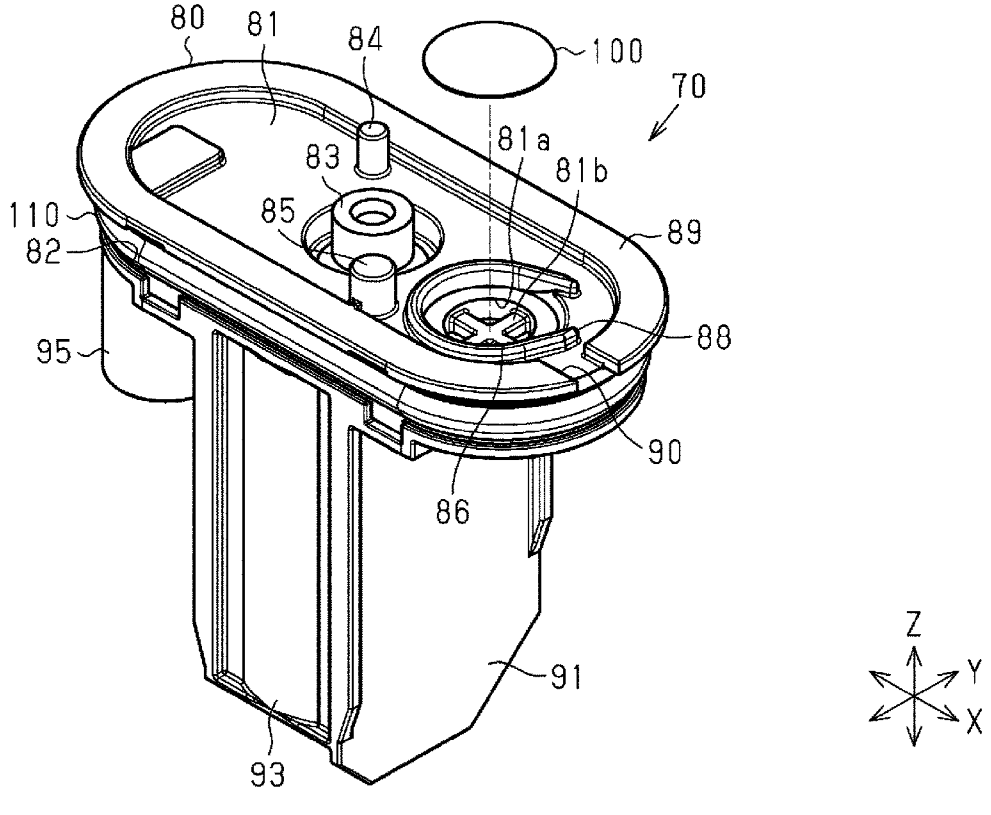
FIG. 13 is an exploded perspective view of a cover.

As shown in FIG. 13, the cover 70 includes a cover body 80 and a breathable film 100. A resin material such as polybutylene terephthalate (PBT) can be cited as a material of the cover body 80. A porous resin material or the like can be cited as a material of the breathable film 100.

The cover body 80 includes a lid portion 81 for covering the opening 32 of the tubular portion 31. The lid portion 81 has an elliptical shape long in the X-axis direction when viewed from the Z-axis direction.

A third accommodation groove 82 is provided over an entire periphery in the outer peripheral surface of the lid portion 81. An annular third sealing member 110 is accommodated into the third accommodation groove 82.

The lid portion 81 includes a vent 81*a* penetrating through the lid portion 81 in the Z-axis direction. The vent 81*a* is provided at a position deviated toward one side in the X-axis direction from a central part of the lid portion 81.

The breathable film 100 covers the vent 81*a* from a side opposite to the two terminals 10 in the Z-axis direction (see FIG. 7). The breathable film 100 has a circular shape when viewed from the Z-axis direction. A diameter of the breathable film 100 is larger than that of the vent 81*a*. The breathable film 100 is, for example, fixed to the lid portion 81 by being fused.

The breathable film 100 is configured to allow the passage of gases such as air and inhibit the passage of liquids such as water. A pressure difference between the inside and outside of the tubular portion 31 is reduced by the breathable film 100.

The vent 81*a* is provided with an X-shaped partitioning portion 81*b* partitioning the vent 81*a*. The touch of worker's fingers with the breathable film 100 through the vent 81*a* is suppressed by the partitioning portion 81*b* of the vent 81*a*.

As shown in FIG. 7, a gap is provided in the Z-axis direction between the breathable film 100 and the partitioning portion 81*b*. Since the breathable film 100 is less likely to be closed by the partitioning portion 81*b* due to this gap, the passage of gasses through the breathable film 100 is less likely to be inhibited.

As shown in FIGS. 3 and 13, the lid portion 81 includes a boss 83 projecting toward the side opposite to the two terminals 10 in the Z-axis direction. The boss 83 projects from a central part of the lid portion 81 in both the X-axis direction and Y-axis direction. The boss 83 has a hollow cylindrical shape having one end closed. The boss 83 is provided with a fastening hole, into which a tap screw 170 including a washer is fastened. The fastening hole is open toward the side opposite to the two terminals 10 in the Z-axis direction.

The lid portion 81 includes a first supporting protrusion 84 and a second supporting protrusion 85. Each supporting protrusion 84, 85 projects toward the side opposite to the two terminals 10 in the Z-axis direction. The first and second supporting protrusions 84, 85 are located on sides opposite to each other across the boss 83 in a direction intersecting both the X-axis direction and Y-axis direction in an XY plane. The first supporting protrusion 84 is located on a side where the holding portion 43 is located in the Y-axis direction when viewed from the boss 83.

Each supporting protrusion 84, 85 has a cylindrical shape. A diameter of the first supporting protrusion 84 is smaller than that of the second supporting protrusion 85.

As shown in FIG. 13, the lid portion 81 includes an inner wall 86 and an outer wall 89 respectively projecting in the Z-axis direction. The inner wall 86 surrounds the outer periphery of the breathable film 100. The outer wall 89 is located on an outer peripheral side of the inner wall 86 and forms the outer peripheral edge of the cover body 80. That is, the outer wall 89 includes the outer peripheral edge of the cover body 80.

The end surfaces in the Z-axis direction of the inner wall 86 and the outer wall 89 are flush with each other. Note that the aforementioned boss 83 and first and second supporting protrusions 84, 85 project beyond the end surfaces in the Z-axis direction of the inner wall 86 and the outer wall 89.

The outer peripheral edge of the outer wall 89 is located radially outward of the opening 32 of the tubular portion 31. The outer wall 89 covers an end surface in the Z-axis direction of the first end part 31*a* of the tubular portion 31 (see FIG. 7).

The inner wall 86 includes an inner discharge port 88 allowing communication between the inside and outside of the inner wall 86 in a direction orthogonal to the Z-axis direction. The outer wall 89 includes an outer discharge port 90 allowing communication between the inside and outside of the outer wall 89 in a direction orthogonal to the Z-axis direction. The inner and outer discharge ports 88, 90 are oriented in mutually different directions. The entire inner discharge port 88 is facing the inner peripheral surface of the outer wall 89. The entire outer discharge port 90 is facing the outer peripheral surface of the inner wall 86.

A virtual axis extending in a communicating direction of the inner discharge port 88 is referred to as a first virtual axis L1, and a virtual axis extending in a communicating direction of the outer discharge port 90 is referred to as a second virtual axis L2. Further, an intersection of the first and second vertical axes L1, L2 is referred to as an intersection P.

Figure 14:
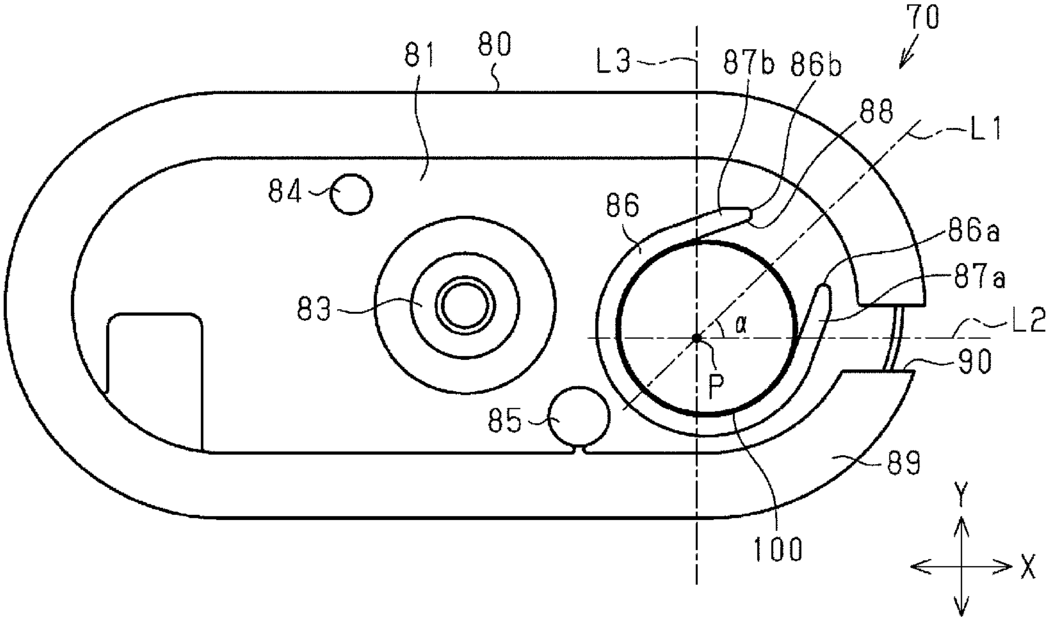
FIG. 14 is a plan view of the cover.

As shown in FIG. 14, the second virtual axis L2 extends in the X-axis direction. The first virtual axis L1 extends obliquely to the second virtual axis L2 in the XY plane. An angle α between the first and second virtual axes L1, L2 is an acute angle.

The entire inner discharge port 88 is closer to a side where the outer discharge port 90 is located than the intersection P in an axial direction of the second virtual axis L2, i.e. the X-axis direction. In other words, the entire inner discharge port 88 is located closer to the side where the outer discharge port 90 is located than a third virtual axis L3 extending in the Y-axis direction and passing through the intersection P.

If the outer discharge port 90 is oriented in a direction of 6 o'clock, the inner discharge port 88 is preferably oriented, for example, to a region between 3 o'clock and 9 o'clock. However, a case where the entire inner discharge port 88 is not facing the inner peripheral surface of the outer wall 89 is excluded.

The inner wall 86 has a first end edge 86*a* and a second end edge 86*b* forming the inner discharge port 88. The first end edge 86*a* is located closer to the outer discharge port 90 than the second end edge 86*b*.

The inner wall 86 is provided with a first extending portion 87*a* extending to include the first end edge 86*a* and a second extending portion 87*b* extending to include the second end edge 86*b*. The first and second extending portions 87*a*, 87*b* are facing each other.

A part of the inner wall 86 except the first and second extending portions 87*a*, 87*b* forms, for example, an arcuate shape along the outer peripheral edge of the breathable film 100. The first and second extending portions 87*a*, 87*b* extend, for example, straight. The first and second extending portions 87*a*, 87*b* extend to approach each other toward the inner discharge port 88.

The first extending portion 87*a* extends obliquely to the second virtual axis L2 to approach the outer discharge port 90 in the axial direction of the second virtual axis, i.e. the X-axis direction, toward the first end edge 86*a*.

Figure 15:
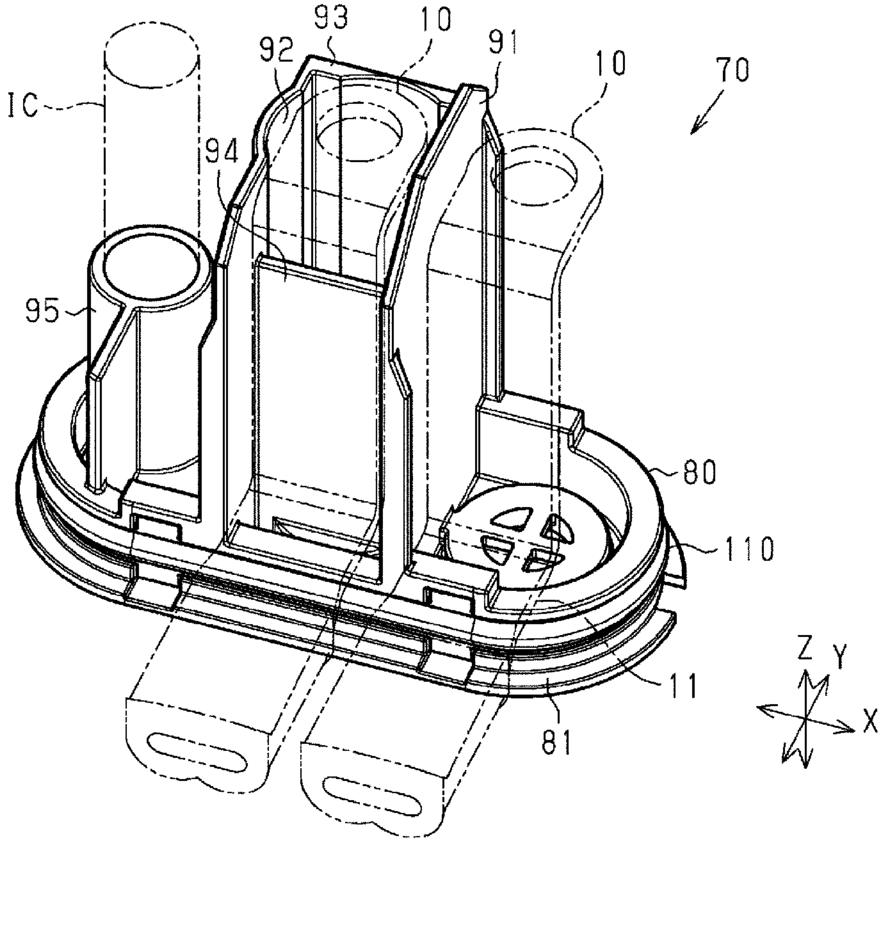
FIG. 15 is a perspective view of the cover.

As shown in FIG. 15, the cover 70 includes a separation wall 91, a facing wall 92, a first coupling wall 93 and a second coupling wall 94 respectively projecting from the lid portion 81 into the tubular portion 31 in the Z-axis direction.

The separation wall 91 is located between the two terminals 10 adjacent to each other. The separation wall 91 extends over the entire lid portion 81 in the Y-axis direction. Parts of the two terminals 10 located inside the opening 32 of the tubular portion 31 are located on sides opposite to each other across the separation wall 91. The separation wall 91 projects to a position beyond the two terminals 10 in the Z-axis direction.

The facing wall 92 is located on a side opposite to the separation wall 91 across one terminal 10. The facing wall 92 is facing the separation wall 91 in the X-axis direction. The facing wall 92 extends substantially over the entire lid portion 81 in the Y-axis direction. A projecting amount of the facing wall 92 from the lid portion 81 is less than that of the separation wall 91 from the lid portion 81.

As shown in FIGS. 4 and 15, the first coupling wall 93 is located on a side opposite to the holding portion 43 across the one terminal 10. The first coupling wall 93 couples the separation wall 91 and the facing wall 92. A projecting amount of the first coupling wall 93 from the lid portion 81 is equal to that of the facing wall 92 from the lid portion 81.

Figure 16:
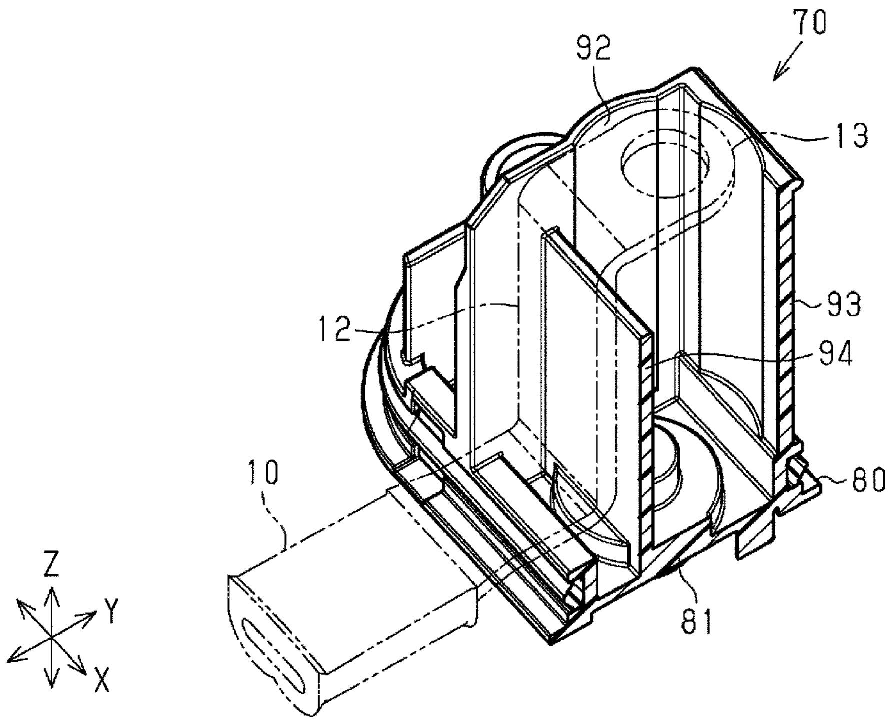
FIG. 16 is a perspective view in section of the cover.

As shown in FIGS. 4 and 16, the second coupling wall 94 is located between the first coupling wall 93 and the second extending portion 12 of the one terminal 10. The second coupling wall 94 couples the separation wall 91 and the facing wall 92. A projecting amount of the second coupling wall 94 from the lid portion 81 is less than that of the first coupling wall 93 from the lid portion 81. A gap is provided between the second coupling wall 94 and the terminal 10 over the entire second coupling wall 94.

Here, the first coupling wall 93 is configured to restrict the insertion of the cover 70 into the tubular portion 31 by contacting the first extending portion 11 of the terminal 10 if the cover 70 is inserted into the tubular portion 31 while being inverted about a center axis of the tubular portion 31 with respect to a proper posture. In this embodiment, the projecting amount of the first coupling wall 93 from the lid portion 81 is larger than a distance from the lid portion 81 to the first extending portion 11 in the Z-axis direction. In this way, the first coupling wall 93 contacts the first extending portion 11 if the cover 70 is inserted in the inverted state into the tubular portion 31.

As shown in FIGS. 7 and 15, the cover 70 includes an accommodating portion 95 projecting from the lid portion 81 into the tubular portion 31 and configured to accommodate one end of the interlock connector IC. The accommodating portion 95 has a hollow cylindrical shape having one end closed.

A projecting amount of the accommodating portion 95 from the lid portion 81 is less than that of each of the separation wall 91, the facing wall 92, the first coupling wall 93 and the second coupling wall 94 from the lid portion 81 and larger than the distance from the lid portion 81 to the first extending portion 11 of the terminal 10 in the Z-axis direction.

Here, if the cover 70 does not include the first coupling wall 93 and is inserted into the tubular portion 31 while being inverted about the center axis of the tubular portion 31 with respect to the proper posture, the accommodating portion 95 is provided at a position capable of contacting the first extending portion 11 of the terminal 10. That is, the accommodating portion 95 is configured to restrict the insertion of the cover 70 into the tubular portion 31 by contacting the terminal 10 if the cover 70 does not include the first coupling wall 93.

An unillustrated shorting pin is provided inside the accommodating portion 95. By accommodating the interlock connector IC into the accommodating portion 95, unillustrated two terminals provided inside the interlock connector IC are electrically connected via the shorting pin. In this way, the circuit inside the interlock connector IC enters an electrically conductive state.

(Configuration of Shield Shell 120)

As shown in FIGS. 2 and 3, the shield shell 120 includes a first shell 130, a second shell 140 and a third shell 150. An iron-based or aluminum-based metal material can be, for example, cited as a material of each shell 130, 140, 150.

(Configuration of First Shell 130)

As shown in FIG. 3, the first shell 130 includes a first part 131 and a second part 135. The first part 131 covers the outer periphery of a part of the tubular portion 31 on a side opposite to the inserting portion 35. The second part 135 covers the outer periphery of a part of the holding portion 43. The first and second parts 131, 135 are open toward the case 200 in the Z-axis direction.

The first shell 130 includes an opening 132, into which the tubular portion 31 is inserted. The opening 132 has an elliptical shape long in the X-axis direction when viewed from the Z-axis direction.

Figure 17:
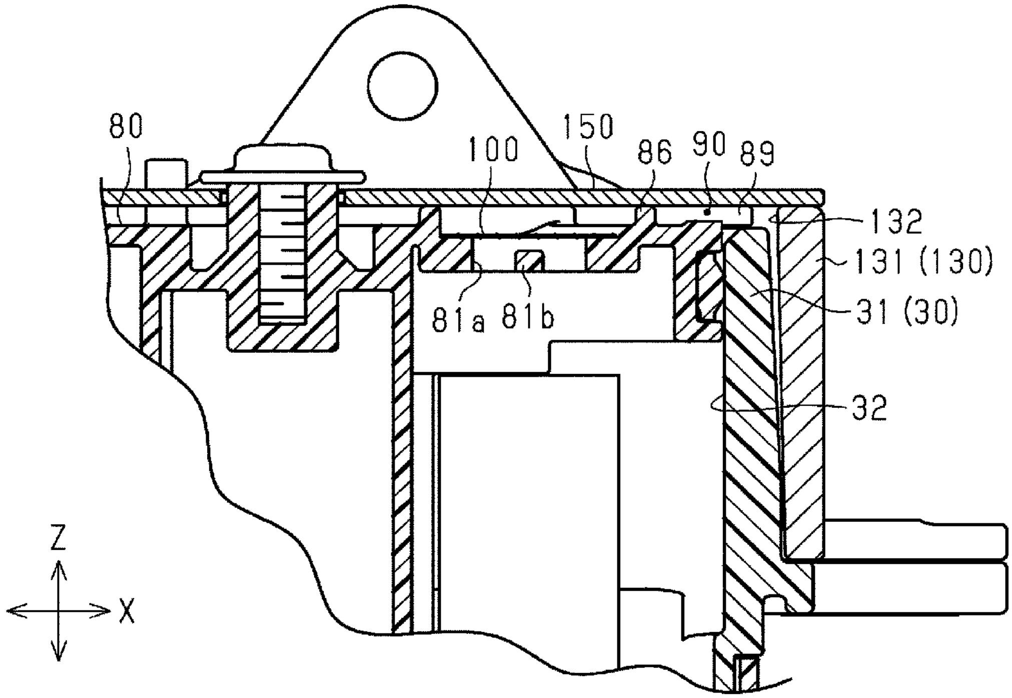
FIG. 17 is a section of the connector.

As shown in FIG. 17, the first part 131 covers the outer discharge port 90 of the cover body 80 from an outer peripheral side of the outer wall 89.

As shown in FIG. 3, the first part 131 includes two fixing projections 133 projecting toward an outer peripheral side of the opening 132. Each fixing projection 133 is provided with a screw hole 133*a* penetrating in the Z-axis direction.

The first part 131 includes two fixing portions 134 projecting toward the outer peripheral side of the opening 132. The two fixing portions 134 are provided at positions respectively corresponding to the two fixing portions 41 of the housing 30. Each fixing portion 134 is provided with a through hole 134*a* penetrating in the Z-axis direction. The through hole 134*a* communicates with the collar 42 provided in the fixing portion 41. As shown in FIG. 2, the connector C1 is fixed to the case 200 by fastening unillustrated bolts inserted through the fixing portions 134, 41 into screw holes 202 provided in the case 200.

As shown in FIG. 3, the second part 135 includes a projecting portion 136 projecting toward a side opposite to the holding portion 43 in the Z-axis direction. The projecting portion 136 is provided with a screw hole 136*a* penetrating in the Y-axis direction.

(Configuration of Second Shell 140)

The second shell 140 has a tubular shape. The second shell 140 covers the outer periphery of a part of the holding portion 43 not covered by the second part 135.

The second shell 140 includes a projecting portion 141 projecting toward the side opposite to the holding portion 43 in the Z-axis direction. The projecting portion 141 is provided with a screw hole 141*a* penetrating in the Y-axis direction. The second shell 140 is fixed to the first shell 130 by fastening a bolt 160 inserted through the through hole 141*a* into the screw hole 136*a* of the first shell 130.

Although not shown, a braided member made of metal for collectively covering the two wires 20 is mounted on the outer peripheral surface of the second shell 140 by a crimp ring.

(Configuration of Third Shell 150)

The third shell 150 is in the form of a flat plate extending in an XY plane. The third shell 150 covers the opening 32 of the tubular portion 31 and the opening 132 of the first shell 130. In this way, the cover 70 is covered by the third shell 150 from the side opposite to the case 200 in the Z-axis direction.

As shown in FIG. 7, the third shell 150 is in contact with the end surfaces in the Z-axis direction of the inner wall 86 and the outer wall 89 of the cover body 80.

As shown in FIG. 3, the third shell 150 includes two through holes 151 respectively communicating with the two screw holes 133*a* of the first shell 130. The third shell 150 is fixed to the first shell 130 by unillustrated bolts inserted through the respective through holes 151.

The third shell 150 includes a boss insertion hole 152, into which the boss 83 of the cover 70 is inserted. A diameter of the boss insertion hole 152 is larger than that of the boss 83. The diameter of the boss insertion hole 152 is smaller than that of the washer of the aforementioned tap screw 170. Note that, as shown in FIG. 4, a gap is provided in the Z-axis direction between this washer and the third shell 150.

As shown in FIG. 3, the third shell 150 includes a first insertion hole 153 and a second insertion hole 154, into which the first and second supporting protrusion 84, 85 are respectively inserted. A diameter of the first insertion hole 153 is larger than that of the first supporting protrusion 84. A diameter of the second insertion hole 154 is larger than that of the second supporting protrusion 85.

From the above, gaps are respectively provided between the boss 83 and the boss insertion hole 152, between the first supporting protrusion 84 and the first insertion hole 153 and between the second supporting protrusion 85 and the second insertion hole 154. The third shell 150 is configured to be swingable in a direction orthogonal to the Z-axis direction with respect to the cover 70 within the ranges of these gaps.

In this way, the worker can easily align the positions of the through holes 151 and the screw holes 133*a*.

Functions and effects of this embodiment are described.

(1) The first sealing member 50 includes the sealing body 51 and the engaging portions 52A, 52B having the first and second engaging projections 53, 54 projecting from the sealing body 51 toward the sides opposite to each other in the Z-axis direction. The first and second engaging projections 53, 54 are provided at the positions overlapping each other in the Z-axis direction. The first engaging projection 53 projects more toward the one side in the circumferential direction than the second engaging projection 54. The second engaging projection 54 projects more toward the other side in the circumferential direction than the first engaging projection 53. The first accommodation groove 36 for accommodating the first sealing member 50 is provided in the outer peripheral surface of the inserting portion 53. The first accommodation groove 36 includes the groove body 37 and the engaged portion 38A having the first and second engaging grooves 39, 40 extending from the groove body 37 toward the sides opposite to each other in the Z-axis direction. The first engaging groove 39 extends more toward one side in the circumferential direction than the second engaging groove 40. The second engaging groove 40 extends more toward the other side in the circumferential direction than the first engaging groove 39.

According to this configuration, the first engaging projection 53 projects more toward the one side in the circumferential direction than the second engaging projection 54, and the second engaging projection 54 projects more toward the other side in the circumferential direction than the first engaging projection 53. Further, the first engaging groove 39 extends more toward the one side in the circumferential direction than the second engaging groove 40, and the second engaging groove 40 extends more toward the other side in the circumferential direction than the first engaging groove 39.

Thus, if the first sealing member 50 is mounted on another housing provided with the first and second engaging grooves 39, 40 having the same shape at the same position in the circumferential direction, it is difficult to engage the first sealing member 50 with the other housing. That is, it is difficult to respectively engage the first and second engaging projections 53, 54 on the first sealing member 50 with the first and second engaging grooves 39, 40 on the other housing. In this way, the worker easily notices the erroneous assembling of the first sealing member 50 with the other housing.

Further, if another sealing member provided with the first and second engaging projections 53, 54 having the same shape at the same position in the circumferential direction is mounted on the housing 30, it is difficult to engage the other sealing member with the housing 30. That is, it is difficult to respectively engage the first and second engaging projections 53, 54 on the other sealing member with the first and second engaging grooves 39, 40 on the housing 30. In this way, the worker easily notices the erroneous assembling of the other sealing member with the housing 30.

From the above, it can be suppressed that the first sealing member 50 is erroneously assembled with a housing different from the housing 30. Further, it can be suppressed that a sealing member different from the first sealing member 50 is erroneously assembled with the housing 30.

(2) The engaging portions 52A, 52B are respectively provided at the one and other ends in the X-axis direction of the sealing body 51. The engaged portions 38A, 38B are respectively provided at the one and other ends in the X-axis direction of the groove body 37.

A pulling direction of a part of the mold M for molding the holding portion 43 may coincide with the Z-axis direction during the injection molding of the housing 30.

Here, the engaged portions 38A, 38B of the first accommodation groove 36 extend in the Z-axis direction from the groove body 37. Thus, the pulling directions of the mold M for molding the engaged portions 38A, 38B are directions separating from the engaged portions 38A, 38B toward an outer peripheral side of the groove body 37, i.e. directions toward one side and the other side in the X-axis direction.

According to the above configuration, the engaged portions 38A, 38B are respectively provided at the one and other ends in the X-axis direction of the groove body 37. Thus, the pulling directions of the mold M for molding the engaged portions 38A, 38B can coincide with the X-axis direction. In this way, it is possible to suppress the interference of the part of the mold M for molding the holding portion 43 and parts thereof for molding the engaging portions 38A, 38B during the opening of the mold M. Therefore, a reduction in the moldability of the housing 30 can be suppressed. Further, the complication of the structure of the mold M for molding the housing 30 can be suppressed.

(3) A central part in the circumferential direction of the first engaging projection 53 is provided at a position overlapping the second engaging projection 54 in the Z-axis direction. A central part in the circumferential direction of the second engaging projection 54 is provided at a position overlapping the first engaging projection 53 in the Z-axis direction.

According to this configuration, an increase in the length of a part of the first engaging projection 53 projecting beyond the second engaging projection 54 on the one side in the circumferential direction and an increase in the length of a part of the second engaging projection 54 projecting beyond the first engaging projection 53 on the other side in the circumferential direction are suppressed. In this way, both ends in the circumferential direction of the engaging portion 52A or 52B easily simultaneously come into the sight of the worker. Thus, the worker easily engages the first and second engaging projections 53, 54 respectively with the first and second engaging grooves 39, 40. Therefore, workability when the first sealing member 50 is mounted can be improved.

(4) The first and second engaging projections 53, 54 have the same shape.

According to this configuration, if the first sealing member 50 is inverted about a virtual axis orthogonal to the center axis of the first sealing member 50, the shapes of the first sealing member before and after inversion overlap. Thus, the worker can accommodate the inverted first sealing member 50 into the first accommodation groove 36. Therefore, versatility when the first sealing member 50 is mounted can be enhanced.

(5) The first sealing member 50 includes the two engaging portions 52A, 52B provided apart from each other in the circumferential direction. The first accommodation groove 36 includes the two engaged portions 38A, 38B provided apart from each other in the circumferential direction.

According to this configuration, since the connector C1 is provided with the two engaging portions 52A, 52B and the two engaged portions 38A, 38B, the worker more easily notices the erroneous assembling of the first sealing member 50.

(6) The first sealing member 50 is shaped to be point symmetric with the center axis of the first sealing member 50 as an axis of symmetry.

According to this configuration, if the first sealing member 50 is inverted about the center axis of the first sealing member 50 or about a virtual axis orthogonal to the center axis, the shapes of the first sealing member 50 before and after inversion overlap. Thus, the worker can accommodate the inverted first sealing member 50 into the first accommodation groove 36. Therefore, versatility when the first sealing member 50 is mounted can be further enhanced.

(7) The first sealing member 50 is located outside the shield shell 120.

According to this configuration, it can be avoided that the first sealing member 50 is covered by the shield shell 120. Therefore, the worker more easily confirms the presence and mounting posture of the first sealing member 50.

Modifications

This embodiment can be modified and carried out as follows. This embodiment and the following modifications can be carried out in combination without technically contradicting each other.

- The first sealing member 50 may be covered by the shield shell 120.
- The two engaging portions 52A, 52B may be provided at an uneven interval in the circumferential direction. In this case, the two engaged portions 38A, 38B may be provided at positions respectively corresponding to the two engaging portions 52A, 52B.
- The number of the engaging portions on the first sealing member 50 and the number of the engaging portions in the first accommodation groove 36 may be one, three or more.
- The first and second engaging projections 53, 54 may have mutually different shapes.
- The central part in the circumferential direction of the first engaging projection 53 may be provided at a position not overlapping the second engaging projection 54 in the Z-axis direction.
- The central part in the circumferential direction of the second engaging projection 54 may be provided at a position not overlapping the first engaging projection 53 in the Z-axis direction.
- The two engaging portions 52A, 52B may be respectively provided at one and the other ends in the Y-axis direction of the sealing body 51. In this case, the two engaged portions 38A, 38B may be respectively provided at one and the other ends in the Y-axis direction of the groove body 37.

LIST OF REFERENCE NUMERALS

α angle
B battery
C1, C2 connector
IC interlock connector
L1 first virtual axis
L2 second virtual axis
L3 third virtual axis
M mold
M1 electric device (connection target)
M2 electric device
P intersection
V vehicle
W1, W2 wiring harness
10 terminal
11 first extending portion
12 second extending portion
13 third extending portion
13*a* bolt hole
14 wire connecting portion
20 wire
21 core wire
22 insulation coating
30 housing
31 tubular portion
31*a* first end part
31*b* second end part
32 opening
33 first partition wall
34 second partition wall
34*a* insertion hole
35 inserting portion
36 first accommodation groove (accommodation groove)
37 groove body
38A, 38B engaged portion
39 first engaging groove
40 second engaging groove
41 fixing portion
42 collar
43 holding portion
44 second accommodation groove
45 rib
46 recess
50 first sealing member (sealing member)
51 sealing body
52A, 52B engaging portion
53 first engaging projection
54 second engaging projection
60 second sealing member
70 cover
80 cover body
81 lid portion
81*a* vent
81*b* partitioning portion
82 third accommodation groove
83 boss
84 first supporting protrusion
85 second supporting protrusion
86 inner wall
86*a* first end edge
86*b* second end edge
87*a* first extending portion
87*b* second extending portion
88 inner discharge port
89 outer wall
90 outer discharge port
91 separation wall
92 facing wall
93 first coupling wall
94 second coupling wall
95 accommodating portion
100 breathable film
110 third sealing member
120 shield shell
130 first shell
131 first part
132 opening
133 fixing projection
133*a* screw hole
134 fixing portion
134*a* through hole

135 second part
136 projecting portion
136*a* screw hole
140 second shell
141 projecting portion
141*a* through hole
150 third shell
151 through hole
152 boss insertion hole
153 first insertion hole
154 second insertion hole
160 bolt
170 tap screw
200 case
201 insertion hole
202 screw hole
210 mating terminal

What is claimed is:

1. A connector to be inserted into an insertion hole provided in a connection target, comprising:

a plurality of terminals parallel to each other, a plurality of wires to be respectively connected to the plurality of terminals;

a housing made of resin and including an inserting portion to be inserted into the insertion hole, the housing holding the plurality of terminals and the plurality of wires; and an annular sealing member for stopping water between the inserting portion and the insertion hole by being mounted on an outer peripheral surface of the inserting portion, when a circumferential direction and an axial direction of the sealing member are respectively merely referred to as a circumferential direction and an axial direction, the sealing member including an annular sealing body and an engaging portion having a first engaging projection and a second engaging projection projecting from the sealing body toward sides opposite to each other in the axial direction, the first and second engaging projections being provided at positions overlapping each other in the axial direction, the first engaging projection projecting more toward one side in the circumferential direction than the second engaging projection, the second engaging projection projecting more toward the other side in the circumferential direction than the first engaging projection, an accommodation groove for accommodating the sealing member being provided in the outer peripheral surface of the inserting portion, the accommodation groove including a groove body for accommodating the sealing body and an engaged portion having a first engaging groove and a second engaging groove extending toward the sides opposite to each other in the axial direction and to be respectively engaged with the first and second engaging projections, the first engaging groove and the second engaging groove being provided at positions overlapping each other in the axial direction, the first engaging groove extending more toward the one side in the circumferential direction than the second engaging groove, and the second engaging groove extending more toward the other side in the circumferential direction than the first engaging groove.

2. The connector of claim 1, wherein:

the housing includes a tubular portion having the inserting portion and a holding portion projecting from the tubular portion toward an outer peripheral side of the tubular portion, the holding portion holding the plurality of terminals and the plurality of wires, and when a direction orthogonal to both the axial direction and a projecting direction of the holding portion is an orthogonal direction, the engaging portion is provided at one end in the orthogonal direction of the sealing body, and the engaged portion is provided at one end in the orthogonal direction of the groove body.

3. The connector of claim 1, wherein:

a central part in the circumferential direction of the first engaging projection is provided at a position overlapping the second engaging projection in the axial direction, and a central part in the circumferential direction of the second engaging projection is provided at a position overlapping the first engaging projection in the axial direction.

4. The connector of claim 1, wherein the first and second engaging projections have the same shape.

5. The connector of claim 1, wherein:

the sealing member includes a plurality of engaging portions provided apart from each other in the circumferential direction, and the accommodation groove includes a plurality of engaged portions provided apart from each other in the circumferential direction.

6. The connector of claim 5, wherein:

the sealing member includes two engaging portions located on sides opposite to each other across a center axis of the sealing member and is shaped to be point symmetric with the center axis as an axis of symmetry, and the accommodation groove includes two engaged portions located on sides opposite to each other across the center axis.

7. The connector of claim 1, comprising a shield shell made of metal for covering an outer periphery of the housing, wherein:

the sealing member is located outside the shield shell.

8. The connector of claim 1, wherein the housing includes a tubular portion having a first end part and a second end part, the axial direction being a direction from the first end part toward the second end part, the one side in the circumferential direction is a counterclockwise direction when the second end part is viewed along the axial direction, and the other side in the circumferential direction is a clockwise direction when the second end part is viewed along the axial direction.

* * * * *